US011935506B2

(12) United States Patent
Sender et al.

(10) Patent No.: US 11,935,506 B2
(45) Date of Patent: Mar. 19, 2024

(54) DEVICE FOR PLAYING A STRING MUSICAL INSTRUMENT

(71) Applicant: P.M.D-PRO MUSIC DEVELOPMENT LTD., Tel Aviv (IL)

(72) Inventors: Yehoshua Sender, Kiriat Mozkin (IL); Noam Sander, Hod Hasharon (IL)

(73) Assignee: P.M.D -PRO MUSIC DEVELOPMENT LTD., Tel Aviv (IL)

( * ) Notice: Subject to any disclaimer, the term of this patent is extended or adjusted under 35 U.S.C. 154(b) by 0 days.

(21) Appl. No.: 17/768,279

(22) PCT Filed: Oct. 22, 2020

(86) PCT No.: PCT/IL2020/051107
§ 371 (c)(1),
(2) Date: Apr. 12, 2022

(87) PCT Pub. No.: WO2021/079367
PCT Pub. Date: Apr. 29, 2021

(65) Prior Publication Data

US 2023/0108885 A1 Apr. 6, 2023

Related U.S. Application Data

(60) Provisional application No. 62/924,746, filed on Oct. 23, 2019.

(51) Int. Cl.
*G10D 3/173* (2020.01)

(52) U.S. Cl.
CPC .................................... *G10D 3/173* (2020.02)

(58) Field of Classification Search
CPC ................................. G10D 3/173; G10D 3/00
See application file for complete search history.

(56) References Cited

U.S. PATENT DOCUMENTS

| | | | |
|---|---|---|---|
| 6,242,677 | B1 | 6/2001 | Sander |
| 2014/0076120 | A1 | 3/2014 | Hollin, Jr. |
| 2015/0020674 | A1 | 1/2015 | Sender et al. |

FOREIGN PATENT DOCUMENTS

| | | | | |
|---|---|---|---|---|
| DE | 202010010878 U1 | 10/2010 | | |
| GB | 2411042 A | 8/2005 | | |
| WO | WO-2010059875 A1 * | 5/2010 | | G10D 3/163 |
| WO | 2013132482 A1 | 9/2013 | | |

OTHER PUBLICATIONS

International search report for international application No. PCT/IL2020/051107 dated Nov. 23, 2022, 3pp.
Written Opinion for international application No. PCT/IL2020/051107 dated Nov. 23, 2022, 6pp.

* cited by examiner

*Primary Examiner* — Kimberly R Lockett
(74) *Attorney, Agent, or Firm* — The Roy Gross Law Firm, LLC; Roy Gross

(57) ABSTRACT

A device for playing a stringed musical instrument comprises (a) a handle-like member to be gripped by a hand of a user; and ((b) a plectrum holder of a mechanically connectable to the handle-like member. The plectrum holder is configured for releasably clamping a plectrum. The receptacle comprises a resilient receptacle having a cavity for receiving said plectrum therewithin configured for receiving and snugly fitting the plectrum. The holder is resiliently connected to said handle-like member.

11 Claims, 6 Drawing Sheets

DEVICE FOR PLAYING A STRING MUSICAL INSTRUMENT

FIELD OF THE INVENTION

The present invention generally relates to musical instruments and particularly to means for playing string instruments such as guitar. More specifically the invention concerns plectrums by which the string instruments are played.

BACKGROUND OF THE INVENTION

As a rule, plectrums (commonly referred to as picks) are held by the player between the forefinger and the thumb and so plucked against the strings to produce the sound. This traditional arrangement has not been changed for centuries in spite of various improvements and modifications of the playing instruments proper, for example, the so-called “electric” guitar and its variations.

It is known that there are several mechanisms that influence the radiated sound production of the guitar or other plucked instrument: (i) the plucking position along the string; (ii) the initial displacement of the string, which is related to the plucking force; (iii) the shape of the string deformation before being released, which is related to the characteristics of the plucking object; (iv) the direction of plucking.

U.S. Pat. No. 6,242,677 discloses a plectrum holding device for playing the guitar and the like string musical instruments comprising an elongated body member, a butt-like rear member mounted to one end of the body member and configured to rest against the thumb root of the player, a trigger-like front member mounted to the other end of the body member and configured to be gripped by a forefinger phalanx ankle of the player; and a mounting for plectrum in a plane substantially perpendicular to the plane of rear and front members within reach of the player’s thumb on one side and the tip of the player’s forefinger on the other side of the plectrum mounting.

PCT/IL2013/050191 discloses a device for playing a stringed musical instrument comprising (a) a handle-like member to be gripped by a hand of a user; (b) a plectrum; and (c) a holder of the plectrum mechanically connected to the aforesaid member. The holder is configured for releasably fixating the plectrum. The plectrum holder is pivotally connected to the member such that an axis of rotation is in a plane of the plectrum and substantially parallel to instrument strings.

There exists a long felt need for providing a device for playing a stringed musical instrument configured for use of any commercially available plectrum.

SUMMARY OF THE INVENTION

It is hence one object of the invention to disclose a device for playing a stringed musical instrument. The aforesaid device comprises (a) a handle-like member to be gripped by a hand of a user; (b) a plectrum receptacle of a mechanically connectable to the handle-like member; the receptacle configured for releasably clamping a plectrum. The receptacle comprises a resilient receptacle configured for receiving and snugly fitting the plectrum.

It is a core purpose of the invention to provide the receptacle resiliently connected to the handle-like member.

Another object of the invention is to disclose the device comprising a connector insertable into a handle-like member and lockable therewithin.

A further object of the invention is to disclose the resilient receptacle having a resilient ear connectable to the connector.

A further object of the invention is to disclose the connector having a recess configured for receiving the ear. The recess has a pin for pivoting the ear.

A further object of the invention is to disclose the connector having a tongue piece releasably lockable by a lock of the handle-like member.

A further object of the invention is to disclose the handle-like member provided with a weight member functioning as an inertia momentum augmenter.

A further object of the invention is to disclose the the handle-like member comprising a body and an extension member connectable to the body.

A further object of the invention is to disclose the body and extension member having a slot and a projection cooperatively configured such that the projection is lockable within the slot.

A further object of the invention is to disclose the extension member having a plurality of form factors suitable to individual anatomic peculiarities of a user.

A further object of the invention is to disclose the device having right- and left-hander positions.

A further object of the invention is to disclose the handle-like member configured into a quadrilateral and substantially flat body with concavely shaped anterior side, posterior side and lower side.

A further object of the invention is to disclose the posterior side configured to rest on the fascia over adductor pollicis muscle. The anterior side configured to rest on an index finger. The lower and upper sides are free when the handle-like member is gripped by the user’s hand. The plectrum is movable between a first finger and the index finger.

A further object of the invention is to disclose a method of playing a stringed musical instrument. The aforesaid method comprises the steps of (a) providing a plectrum; (b) providing a device for playing a stringed musical instrument; the device comprising: (i) a handle-like member to be gripped by a hand of a user; (ii) a plectrum receptacle of a mechanically connectable to the a handle-like member; the receptacle configured for releasably clamping the plectrum; the receptacle comprises a resilient receptacle configured for receiving and snugly fitting the plectrum; the receptacle is resiliently connected to the handle-like member; (b) inserting the plectrum into the receptacle; (c) gripping the device by the user’s hand; (d) picking the strings by means of the plectrum.

A further object of the invention is to disclose the step of picking the strings by means of the plectrum comprising oscillating the plectrum on the resilient ear.

A further object of the invention is to disclose the resilient receptacle comprising a side recess configured for alternatively receiving the plectrum thereinto such that when held by player fingers a mechanical contact between the plectrum and the player fingers is provided.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, so as to enable any person skilled in the art to make use of the invention and sets forth the best modes contemplated by the inventor of carrying out this invention. Various modifications, however, are adapted to remain apparent to those skilled in the art, since the generic principles of the present invention have been defined specifically to provide a device for playing a stringed musical instrument and a method of playing the same musical instrument.

Figure 1:
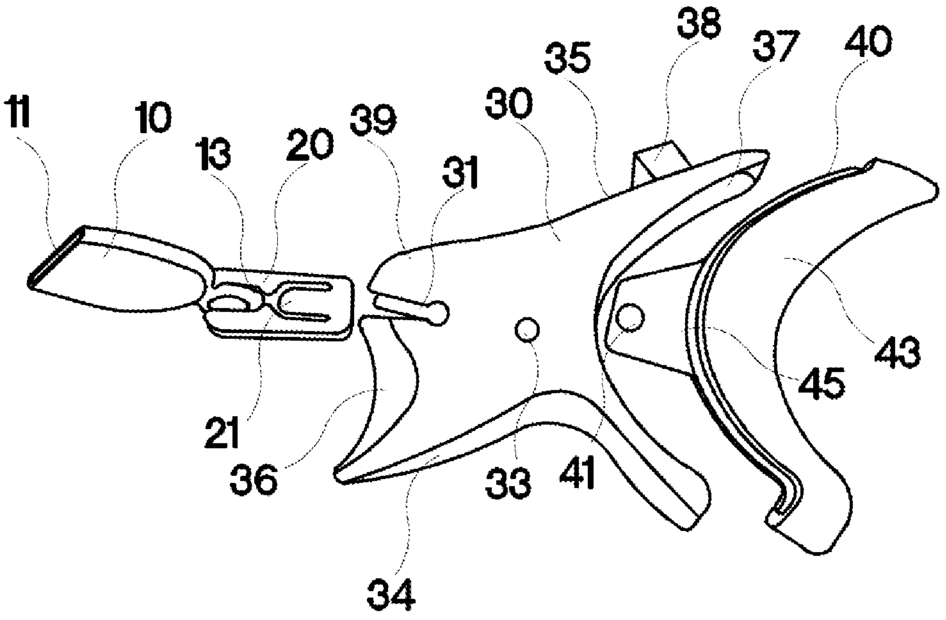
FIG. 1 is a general exploded view of a device for playing a string musical instrument.

Reference is now made to FIG. 1 presenting a device for playing a stringed musical instrument of the present invention. The aforesaid device comprises the following main parts: receptacle 10, connector 20, body 30 and extension member 40. Parts 30 and 40 form a handle-like member to be gripped by a hand of a user (not shown). Body 30 has a substantially flat quadrilateral shape and body with concavely shaped anterior side 36, upper side 35 and lower side 35. At posterior side of body 30, there is slot 37 configured for receiving projection 45 with pin 41 lockable within hole 33 of body 30. Projection 45 of extension 40 has a pin 41 within hole 33. When extension 40 is connected to body 30, surface 43 forms a posterior side of the handle-like member. Receptacle 10 is provided with an ear 13. Numeral 11 refers to an entrance port of receptacle 10. Connector 20 is lockable within slot 39. Specifically, connector is provided with a sprung tongue piece 21 releasably lockable by a lock 31 of body 30.

Figure 2:
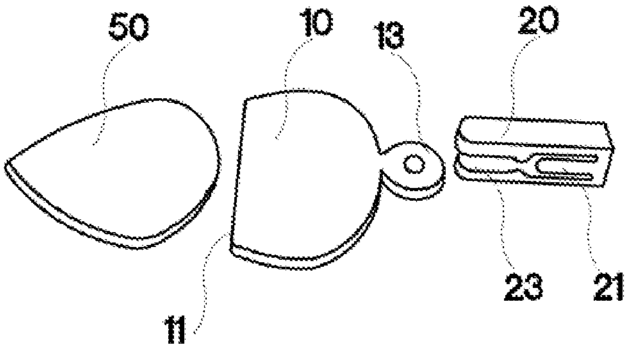
FIG. 2 is a view of a plectrum arrangement.
Figure 3:
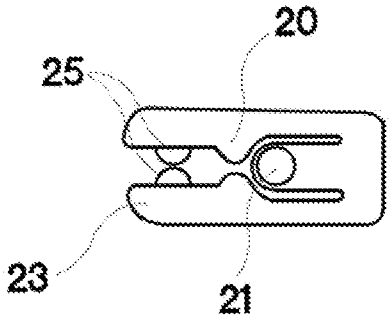
FIG. 3 is a side view of a connector.

Reference is now made to FIGS. 2 and 3, showing resilient receptacle 10 which is configured for receiving plectrum 50 therewithin. Plectrum 50 is clamped by fitting snugly more than its half by resilient receptacle 10. It should be emphasized that the device for playing a stringed musical instrument is configured for use of any commercially available plectrum. Connector 20 is provided with gap 23 receiving ear 13 of receptacle 10. Gap 23 has a pin 25 pivoting ear 13 such that receptacle 10 is positionable into right- and left-hander positions (shown below).

Figure 4:
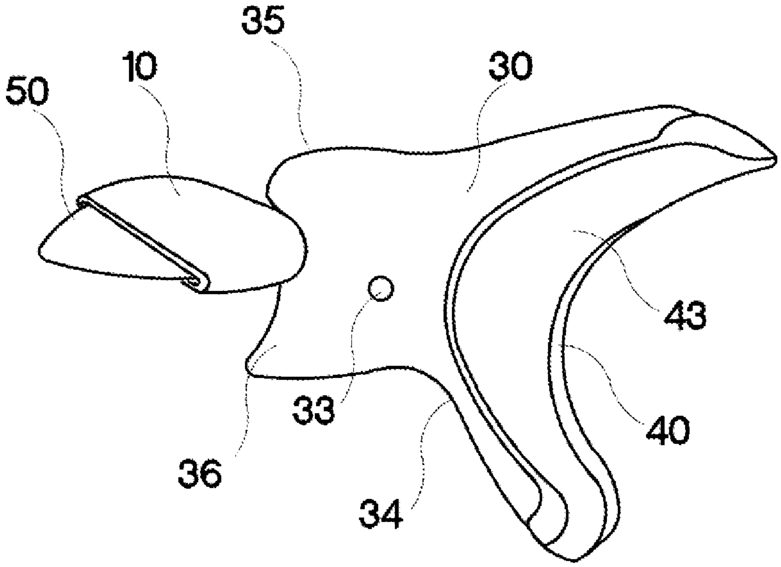
FIG. 4 is a general assembled view of a device for playing a string musical instrument.

Reference is now made to FIG. 4, presenting the device for playing a stringed musical instrument of the present invention in assembled position. Posterior side 43 is configured to rest on the fascia over adductor pollicis muscle. Anterior side 36 is configured to rest on an index finger. Lower and upper sides 34 and 35 are free when said handle-like member is gripped by the user's hand (not shown). Plectrum 50 is movable between a first finger and an index finger.

Figure 5A:
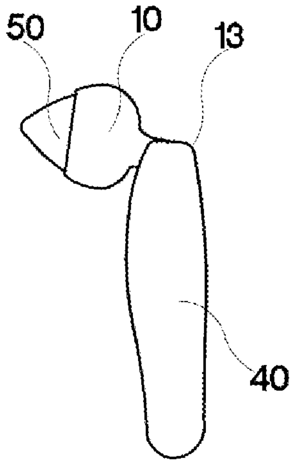
FIGS. 5*a* and 5*b* are top views of a device for playing a stringed musical instrument in two positions.
Figure 5B:
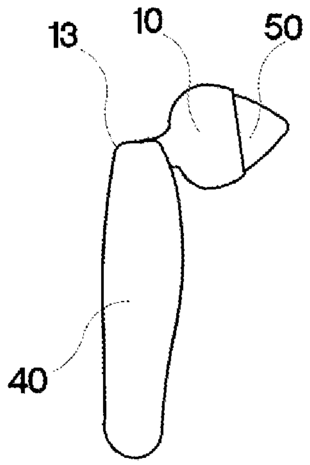

Reference is now made to FIGS. 5*a* and 5*b*, showing right- and left-hander positions of the device for playing a stringed musical instrument of the present invention. Receptacle 10 with plectrum 50 is easily manipulated into the aforesaid right- and left-hander positions because ear 13 such that receptacle 10 is pivoted by a pin within gap 23.

It should be emphasized that the resilient plectrum receptacle 10 accommodates plectrum 50. In other words, receptacle 10 holds plectrum 50 and provides player's fingers a convenient and reliable grip. Resilient receptacle 10, however, reduces a direct mechanical contact between player's and plectrum 50 which plucks the strings and cushions the shock that this plucking creates in comparison with playing by fingertips. Therefore, resilient receptacle 10 can be considered as a shock absorber as well.

Figure 6A:
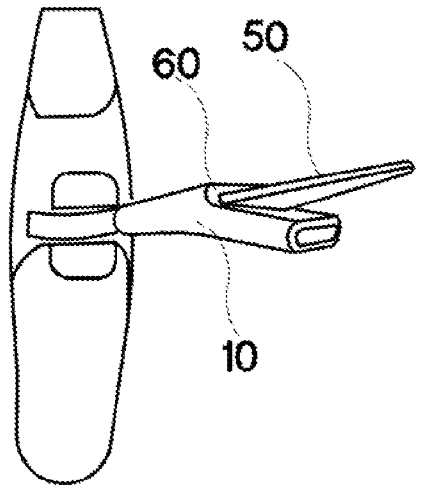
FIGS. 6*a*, 6*b* and 6*c* are front, top and side views of an alternative embodiment of a device for playing a stringed musical instrument.
Figure 6B:
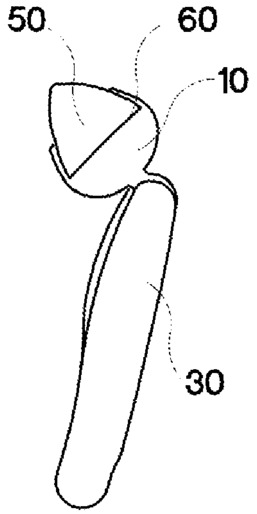
Figure 6C:
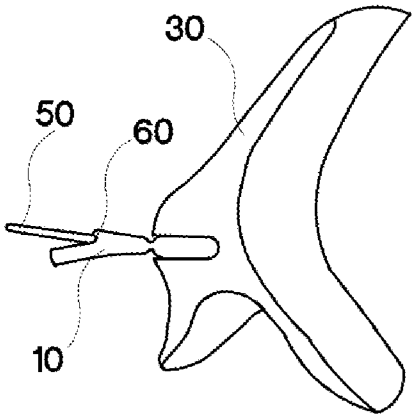

Reference is now made to FIGS. 6*a* to 6*c* presenting an alternative embodiment of the present invention. Front, top and side views are shown in FIGS. 6*a*, 6*b* and 6*c*, respectively. In order to provide a more efficient contact between a player's finger and plectrum 50 resulting in a balanced shock, resilient receptacle 10 comprises recess on a side surface introduced in the resilient receptacle enabling the insertion 60. Recess 60 is configured for receiving plectrum 60. When plectrum 50 is inserted into recess 60 of resilient receptacle 10 which gripped by the player's fingers (not shown), a more rigid mechanical linkage between player's fingers and plectrum 50 is provided. Specifically, a larger surface of the plectrum is exposed to the thumb and more rigid finger-plectrum contact on one side of plectrum 50 results in balanced shocks of string plucking.

Resilience of receptacle 10 provides reliable holding plectrum in place within receptacles 10. Decrease in the portion plectrum 50 accommodated within receptacle 10 allows enlarging the contact surfaces on both sides of plectrum 50 but damages reliability of holding plectrum 50.

Figure 7A:
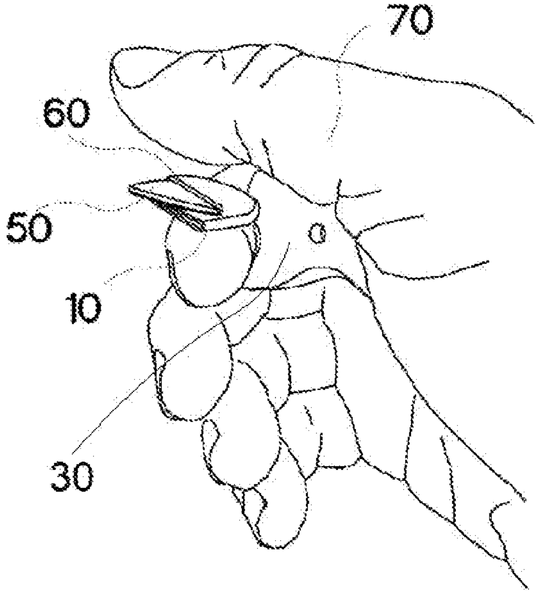
FIGS. 7*a* and 7*b* are side views of a resilient receptacle with a plectrum inserted into side recess.
Figure 7B:
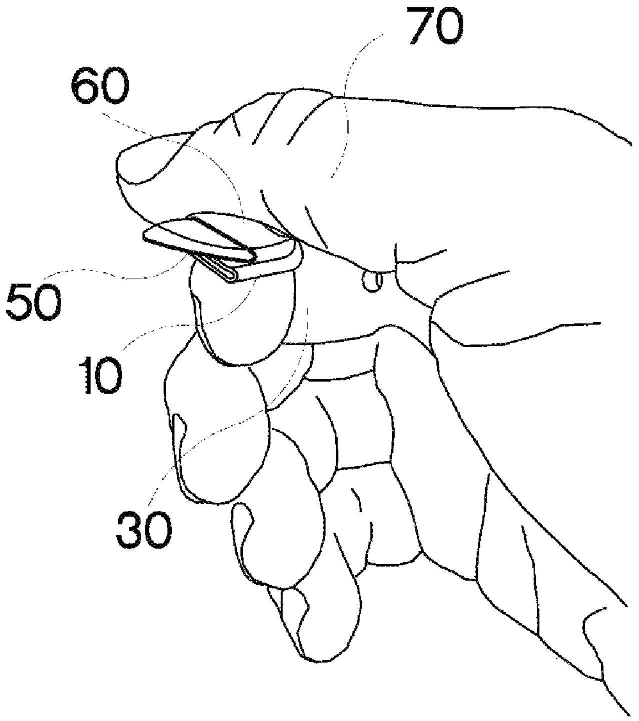

Reference now made to FIGS. 7*a* and 7*b* presenting an embodiment of the present invention designed for using receptacle 10 without parts 30 and 40 forming a handle-like member. FIGS. 7*a* and 7*b* show resilient receptacle 10 with plectrum 60 inserted into recess 60 and without it, respectively.

A core feature of the invention to provide the receptacle resiliently connected to the handle-like member.

According to one embodiment of the present invention, the device comprises a connector insertable into the handle-like member and lockable therewithin.

According to another embodiment of the present invention, the resilient receptacle has a resilient ear connectable to the connector.

According to a further embodiment of the present invention, the connector has a recess configured for receiving the ear. The recess has a pin for pivoting the ear.

According to a further embodiment of the present invention, the connector has a tongue piece releasably lockable by a lock of the handle-like member.

According to a further embodiment of the present invention, the handle-like member is provided with a weight member functioning as an inertia momentum augmenter.

According to a further embodiment of the present invention, the the handle-like member comprises a body and an extension member connectable to the body.

According to a further embodiment of the present invention, the body and extension member has a slot and a projection cooperatively configured such that the projection is lockable within the slot.

According to a further embodiment of the present invention, the extension member has a plurality of form factors suitable to individual anatomic peculiarities of a user.

According to a further embodiment of the present invention, the device has right- and left-hander positions.

According to a further embodiment of the present invention, the handle-like member is configured into a quadrilateral and substantially flat body with concavely shaped anterior side, posterior side and lower side.

According to a further embodiment of the present invention, the posterior side is configured to rest on the fascia over adductor pollicis muscle. The anterior side configured to rest on an index finger. The lower and upper sides are free when the handle-like member is gripped by the user's hand. The plectrum is movable between a first finger and the index finger.

According to a further embodiment of the present invention, the resilient receptacle comprises a side recess configured for alternatively receiving the plectrum thereinto such that when held by player fingers a mechanical contact between the plectrum and the player fingers is provided.

According to a further embodiment of the present invention, a method of playing a stringed musical instrument is disclosed. The aforesaid method comprises the steps of (a) providing a plectrum; (b) providing a device for playing a stringed musical instrument; the device comprising: (i) a handle-like member to be gripped by a hand of a user; (ii) a plectrum receptacle of a mechanically connectable to the a handle-like member; the receptacle configured for releasably clamping the plectrum; the receptacle comprises a resilient receptacle configured for receiving and snugly fitting the plectrum; the receptacle is resiliently connected to the handle-like member; (b) inserting the plectrum into the receptacle; (c) gripping the device by the user's hand; (d) picking the strings by means of the plectrum.

The invention claimed is:

1. A device for playing a stringed musical instrument; said device comprising:

a. a handle-like member to be gripped by a hand of a user;

b. a plectrum receptacle mechanically connectable to said handle-like member; said plectrum receptacle configured for releasably clamping a plectrum;

said plectrum receptacle comprises a resilient receptacle having a cavity for receiving said plectrum therewithin, said cavity configured for receiving and snugly fitting said plectrum; and c. a connector insertable into said handle-like member and lockable therewithin; said resilient receptacle having a resilient ear connectable to said connector;

wherein said resilient receptacle is resiliently connected to said handle-like member;

wherein said connector has a recess configured for receiving said ear; said recess has a pin for pivoting said ear.

2. The device according to claim 1, wherein said connector has a sprung tongue piece releasably lockable by a lock of said handle-like member.

3. The device according to claim 1, wherein said handle-like member is provided with a weight member functioning as an inertia momentum augmenter.

4. The device according to claim 1, wherein said handle-like member comprises a body and an extension member connectable to said body.

5. The device according to claim 4, wherein said body and extension member have a slot and a projection cooperatively configured such that said projection is lockable within said slot.

6. The device according to claim 4, wherein said extension member has a plurality of form factors suitable to individual anatomic peculiarities of a user.

7. The device according to claim 1 having right- and left-handed positions.

8. The device according to claim 1, wherein said handle-like member is configured into a quadrilateral and substantially flat body with concavely shaped anterior side, posterior side and lower side.

9. The device according to claim 8, wherein said posterior side is configured to rest on the fascia over adductor pollicis muscle; said anterior side is configured to rest on an index finger, said lower and upper sides are free when said handle-like member is gripped by the user's hand; and said plectrum is movable between a first finger and said index finger.

10. The device according to claim 1, wherein said resilient receptacle comprises a side recess configured for alternatively receiving said plectrum thereinto such that when held by player fingers a mechanical contact between said plectrum and said player fingers is provided.

11. A method of playing a stringed musical instrument; said method comprising the steps of:

a. providing a plectrum;

b. providing a device for playing a stringed musical instrument; said device comprising:

i. a handle-like member to be gripped by a hand of a user;

ii. a plectrum receptacle mechanically connectable to said handle-like member; said receptacle configured for releasably clamping said plectrum;

said plectrum receptacle comprises a resilient receptacle configured for receiving and snugly fitting said plectrum; said resilient receptacle is resiliently connected to said handle-like member; and iii. a connector insertable into said handle-like member and lockable therewithin; said resilient receptacle having a resilient ear connectable to said connector;

c. inserting said plectrum into said receptacle;

d. gripping said device by said user's hand; and e. picking said strings by means of said plectrum;

wherein said connector has a recess configured for receiving said ear; said recess has a pin for pivoting said ear.

* * * * *